United States Patent [19]

Bachman et al.

[11] Patent Number: 4,924,418

[45] Date of Patent: May 8, 1990

[54] UNIVERSAL MONITOR

[75] Inventors: Wesley J. Bachman, Auburn; Steven G. Stone, Virden, both of Ill.

[73] Assignee: Dickey-John Corporation, Auburn, Ill.

[21] Appl. No.: 238,975

[22] Filed: Aug. 23, 1988

Related U.S. Application Data

[63] Continuation-in-part of Ser. No. 154,786, Feb. 10, 1988, abandoned.

[51] Int. Cl.[5] ........................ G06F 15/20; A01D 41/00

[52] U.S. Cl. ................................ 364/550; 364/424.03; 364/424.04

[58] Field of Search ........................ 364/424.03, 424.04, 364/431.04, 550, 551.01, 551.02, 552; 340/660; 324/113, 114

[56] References Cited

U.S. PATENT DOCUMENTS

| | | | |
|---|---|---|---|
| 4,052,003 | 10/1977 | Steffen | 239/71 |
| 4,258,421 | 3/1981 | Juhasz et al. | 364/424.04 |
| 4,296,409 | 10/1981 | Whitaker et al. | 364/424.03 |
| 4,376,298 | 3/1983 | Sokol et al. | 364/424.03 |
| 4,392,611 | 7/1983 | Bachman et al. | 239/74 |
| 4,404,641 | 9/1983 | Bazarnik | 364/424.03 |
| 4,419,654 | 12/1983 | Funk | 340/52 |
| 4,432,064 | 2/1984 | Barker et al. | 364/550 |
| 4,551,801 | 11/1985 | Sokol | 364/424.03 |
| 4,613,939 | 9/1986 | Paine | 364/424.04 |
| 4,757,463 | 7/1988 | Ballou et al. | 364/424.04 |
| 4,764,727 | 8/1988 | McConchie, Sr. | 340/660 |
| 4,807,161 | 2/1989 | Comfort et al. | 364/550 |

*Primary Examiner*—Parshotam S. Lall
*Assistant Examiner*—Christopher L. Makay
*Attorney, Agent, or Firm*—Richard Bushnell; Trexler, Bushnell, Giangiorgi & Blackstone

[57] ABSTRACT

A method and apparatus are provided for monitoring a plurality of functions and conditions of a machine which includes a plurality of sensors for producing sensor signals corresponding to these functions and conditions. The monitoring method comprises providing at least one monitoring module having a plurality of inputs, each for receiving a selected one of the sensor signals. The module also has a processor responsive to the sensor signals at the inputs for producing display signals corresponding to the associated functions and conditions, a display responsive to the display signals for producing observable indications of the corresponding functions and conditions, and a memory for storing data and instructions for enabling the processor to respond to the sensor signals from any of the sensors for monitoring any of the corresponding functions and conditions. The method proceeds by programming the memory with data and instructions for monitoring the plurality of functions and conditions of the machine. The aforementioned monitoring module comprises the apparatus of the invention.

15 Claims, 8 Drawing Sheets

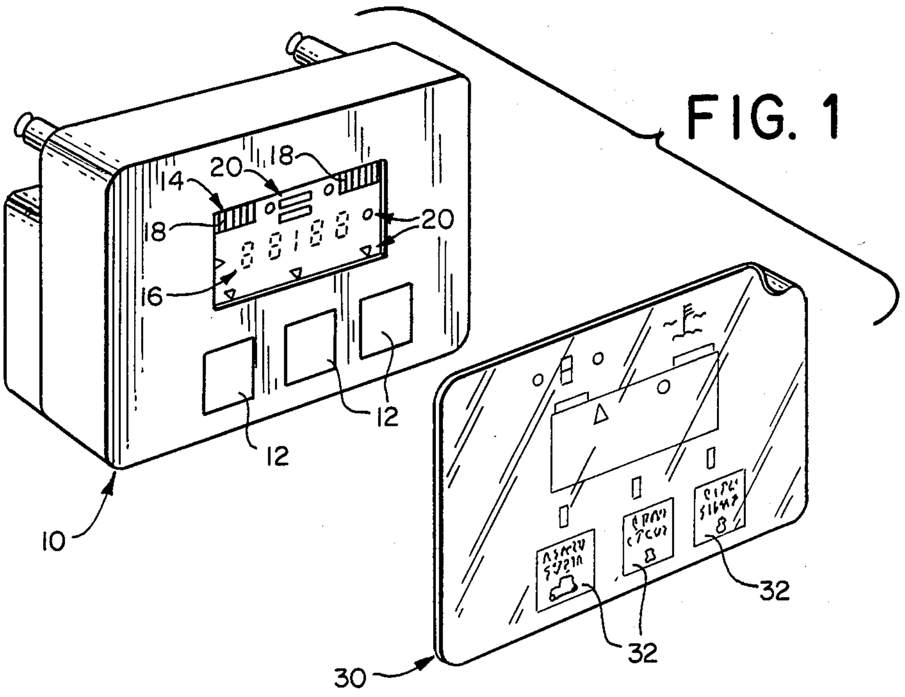
FIG. 1
FIG. 3
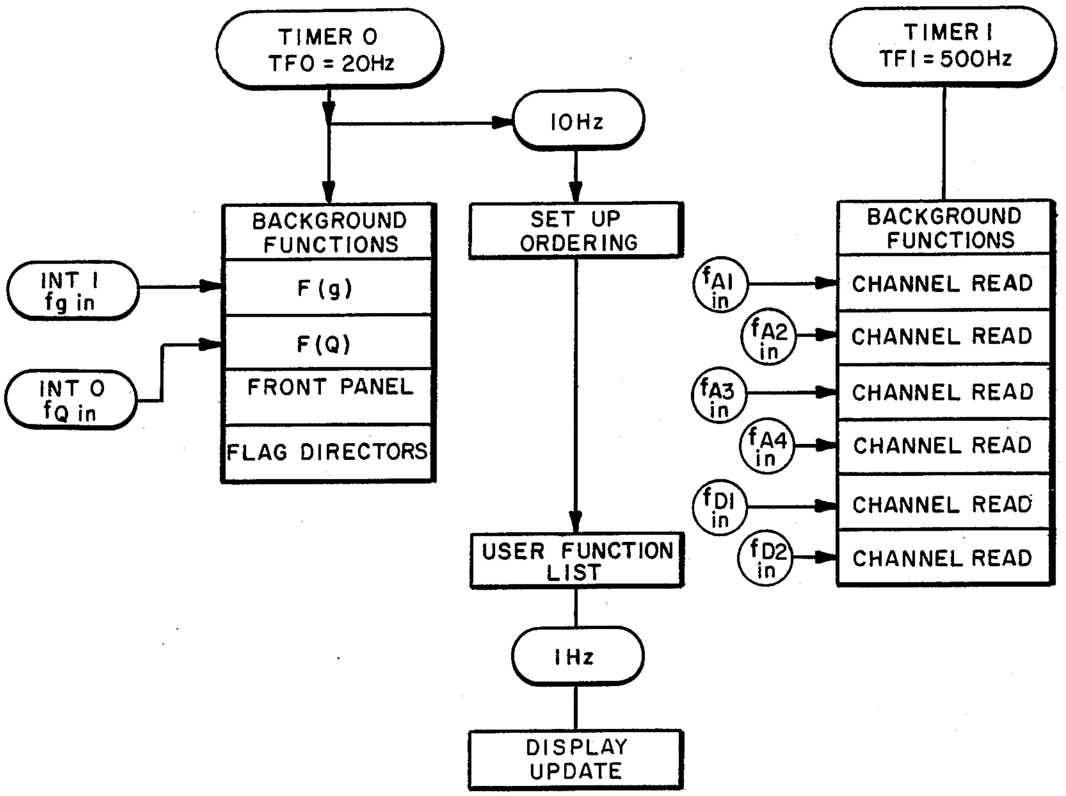

UNIVERSAL MONITOR

This application is a continuation-in-part of application Ser. No. 154,786, filed Feb. 10, 1988 now abandoned.

BACKGROUND OF THE INVENTION

The present invention is directed generally to the monitoring arts and more particularly to a novel and improved universal monitoring system for monitoring a plurality of functions and conditions of a machine.

While the invention is not so limited, the description will be facilitated at times by specific description and reference to the monitoring of a plurality of functions and conditions of a machine comprising a mobile vehicle such as a tractor. It should be understood that the universal module of the invention, in accordance with the novel features thereof, may be adapted for use with a broad variety of different machines, vehicles, or other apparatus.

Generally speaking, various monitoring systems have heretofore been proposed for agricultural vehicles and the like. One such monitoring system as shown and described in U.S. Pat. No. 4,419,654 entitled Tractor Data Center. Reference is also invited to U.S. Pat. No. 4,551,801 entitled Module Vehicular Monitoring System, as well as to our co-pending application Ser. No. 097,451, filed Sept. 15, 1987 entitled Universal Control For Material Distribution Device. We have invented a number of improvements on the systems shown in the foregoing patents and application, and particularly in the latter patent and patent application.

Generally speaking, the prior art has utilized monitoring systems in the form of "dedicated" monitors. A dedicated monitor is generally one in which the functions and conditions of the machine, vehicle, or the like to be monitored, as well as the particular sensors provided on this machine, are identified in advance. Hence, the monitor is specifically designed for use with, and hence is "dedicated" to, the monitoring of-these particular functions and conditions in response to signals from these particular, pre-identified associated sensors. Hence, such a "dedicated" monitoring system generally cannot be readily modified to accommodate different machines or vehicles, different sensors, and/or different conditions and functions.

Departing from this prior art "dedicated" systems approach, the above-referenced U.S. Pat. No. 4,551,801 proposes a modular approach in which a plurality of physically similar or standardized "modules" are provided These modules can be modified within certain limits to accommodate different sensors and different functions and conditions, so as to be useful either individually or in groups to monitor a given combination of functions and conditions, as desired, in connection with a given machine, vehicle or the like.

We have improved further on the foregoing concept, and we now propose a "universal" or fully "programmable" type of monitoring system which may be readily adapted for use with many different machines, vehicles or the like. This universal system is capable of being provided either as an original equipment system or retro-fitted to any of a variety of different machines, vehicles or the like.

We have discovered that the majority of machine or vehicle functions and conditions which are usually desired to be monitored, and more particularly, the types of signals generated by sensors generally provided for such monitoring, fall into a limited number of types or categories. For example, many signals may be characterized as either "analog" or "digital" signals, in that the sensor provides a signal which varies in either an analog or a digital fashion in accordance with the value of the function or condition to be monitored. On the other hand, some conditions require only monitoring as to a certain critical or alarm level, and hence may utilize a sensor which provides only some threshold switching or "on/off" type of output signal. Yet other applications are most readily accommodated by sensors which provide a frequency-related signal, that is a signal whose frequency varies in some known fashion in accordance with the value of the condition or function being monitored.

Moreover, we have recognized that a large number of calculations or mathematical functions, as well as operating level programming of a computer-based system designed to accommodate such monitoring systems, will have a great deal in common, regardless of the particular functions and conditions, and associated sensors, which are selected for monitoring.

Accordingly, from these discoveries and concepts, we have deduced a number of general concepts as follows:

1. Define a desired set of sub-functions.
2. Implement them in hardware and fixed software code to run in real time.
3. Implement in code a general software mathematical operations package.
4. Provide in code all software needed to recognize switches, and to operate displays and alarm outputs with respect to operational function only.
5. Define a set of readout (or user-selectable) functions which are pertinent to market needs and are consistant with the defined set of sub-functions.
6. Define a factory program level which consists of a numeric code entry, with access being restricted to authorized factory or other programming personnel.
7. Provide in code the readout functions, with factory program level codes, to allow both the selection and the assignment of display locations of the various readout functions.
8. Provide in code, to select at factory program level, the ability to allow or disallow user programming of associated constants and limit values, together with the ability to accommodate input sense and polarity.

OBJECTS AND SUMMARY OF THE INVENTION

In view of the foregoing considerations, we have proposed a device that is manufacturable as a common or universal monitor, such that it can be configured to various specific user needs by providing an appropriate front panel decal or label and by entry of the proper factory program level code or codes. The actual operating ROM program code does not require a change from one application to another, thus eliminating the expense of recoding and remasking of ROM components. We believe that this procedure will minimize cost and facilitate relatively short turn-around times for both prototypes and production units. Moreover, we believe this approach will render economically feasible the development of monitors even for relatively low volume markets.

Accordingly it is a general object of the invention to provide a novel and improved universal type of monitoring system, generally in accordance with the foregoing discussion.

Briefly, and in accordance with the invention, a method is provided for monitoring a plurality of functions and conditions of a machine, said machine including a plurality of sensors for producing sensor signals corresponding to said plurality of functions and conditions, said monitoring method comprising: providing at least one monitoring module comprising a plurality of input means each for receiving a selected one of said sensor signals, said module further comprising processing means responsive to said sensor signals at said input means for producing display signals corresponding to the associated functions and conditions in accordance with said sensor signals, display means responsive to the display signals for producing observable indications of the corresponding functions and conditions, and memory means for storing data and instructions for enabling said processing means to respond to the sensor signals from any of the sensor means for monitoring any of the corresponding functions and conditions; and programming said memory means with data and instructions for monitoring said plurality of functions and conditions.

The invention also extends to a monitoring module for monitoring a plurality of functions and conditions of a machine, said machine having a plurality of sensors associated therewith for producing sensor signals corresponding to said plurality of functions and conditions, said monitoring module comprising: a plurality of input means, each for receiving a respective, selected one of said sensor signals; processing means responsive to the sensor signals received at said input means for producing display signals corresponding to the associated functions and conditions in accordance with said sensor signals; memory means for storing data and instructions for enabling said processing means to respond to the sensor signals from any of said sensor means for monitoring any of said corresponding functions and conditions; and programming means for programming said memory means with data and instructions for response to any given plurality of sensors coupled to said input means for monitoring a corresponding plurality of functions and conditions.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 1 is a perspective view, somewhat diagrammatic in form, of a universal monitoring module in accordance with the invention;

FIG. 3 is a functional block diagram, somewhat in the nature of a flow chart, illustrating, in part, the operation of the system of the invention;

DETAILED DESCRIPTION OF THE ILLUSTRATED EMBODIMENT

Figure 2A:
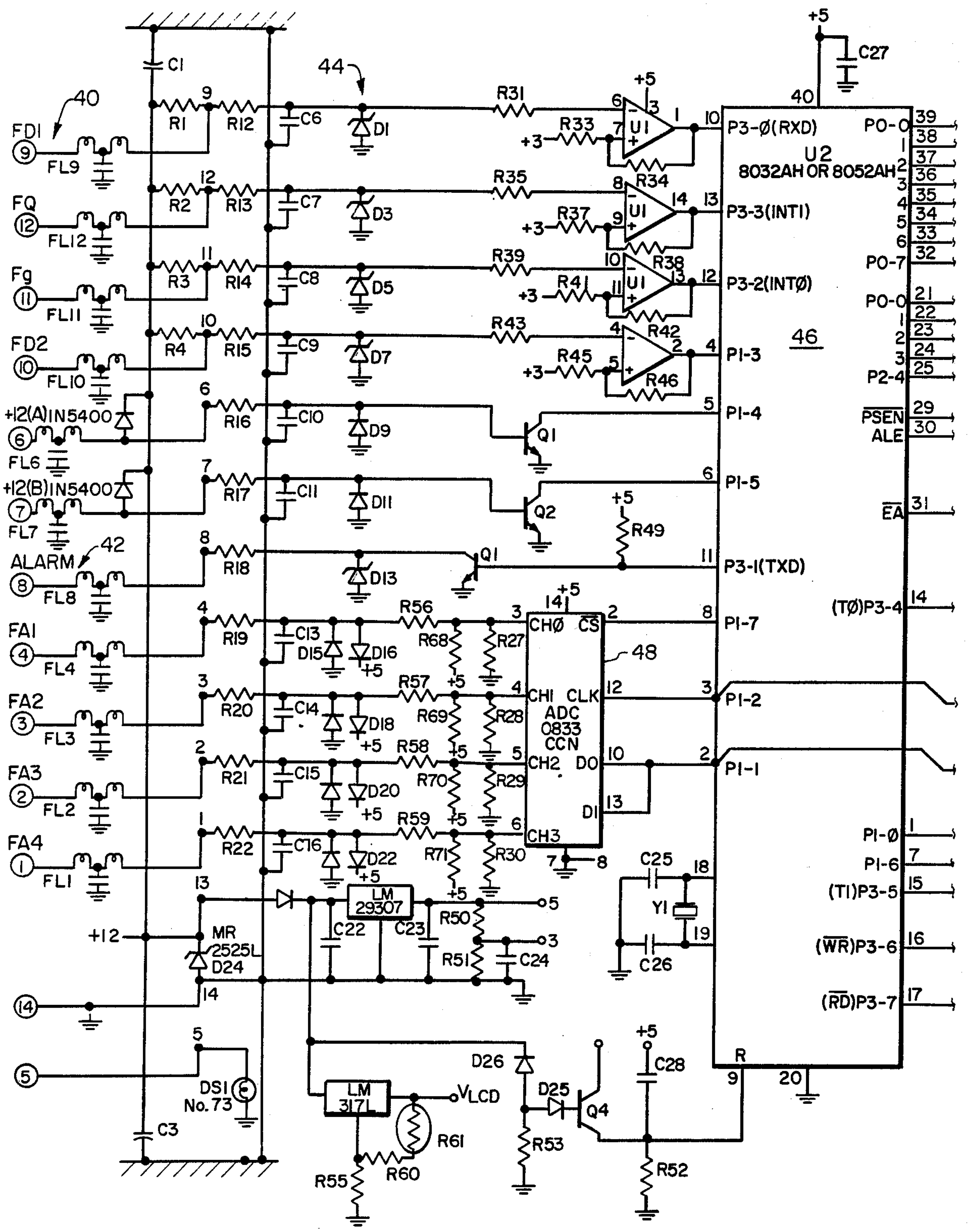
FIGS. 2A and 2B form a schematic circuit diagram, illustrating the electrical and electronics circuit portion of the universal monitor of the invention.

Referring to the drawings and initially to FIG. 1, the present invention contemplates a method for monitoring a plurality of functions and conditions of a machine, and apparatus in the form of a modular system for carrying out this method. The modular system is comprised of one or more modules, of the type we have designated "universal monitoring module", the exterior of one such "universal" module being designated by reference numeral 10 in FIG. 1. Preferably, this universal monitoring module 10 remains substantially physically unchanged, regardless of the application in which it is utilized. Hence, the module utilizes a substantially fixed circuit configuration, shown in FIGS. 2A and 2B or alternatively in FIGS. 8A, 8B and 8C, such that only certain programming and memory selection operations need be carried out to, in effect, adapt or customize the module for use with any given machine, vehicle, or the like. Hence, depending upon the number and type of functions and conditions of a given machine which are to be monitored, one or more substantially physically and electrically identical modules such as the module 10 may be programmed and adapted for use with a given machine.

Initially, it will be seen that the module 10 includes one or more operator accessible control means which in the illustrated embodiment comprise pressure-sensitive type switches 12. A display panel 14 contains a plurality of visual display elements, including a group of seven-segment alphanumeric characters 16, bar graph displays 18, and various other selectively energizable visual display elements 20. These various visual display elements are suitable for producing visual displays corresponding to a wide variety of functions and conditions. Hence, these displays accommodate those functions and conditions for which a numerical value readout may be required, as well as those for which some analog bar graph type display is appropriate, or for which only some warning indicator or on/off type of display is appropriate. Preferably, the display panel 14 of the illustrated embodiment comprise-s an LCD (liquid crystal display) panel; however, other types of display elements and arrangements may be utilized without departing from the invention.

In accordance with a preferred feature of the invention, a separate decal or label means 30 is also provided. This label 30 may be custom screened, printed or otherwise produced so as to provide labeling for the various display elements to correspond generally to the functions and conditions to be displayed thereby. Accordingly, it will be seen that upon customizing or programming of a given module 10 to monitor a given set of functions and conditions, an appropriate label 30 may be printed or otherwise produced and superimposed upon the face of that module 10. The label 30 may further include suitable indicia 32 to be superimposed upon the pressure-sensitive switches 12 to indicate the control operations to be performed by each.

Turning now to FIG. 2, generally speaking, each monitoring module has a plurality of inputs or input means designated generally by the reference numeral 40. These inputs 40 may be coupled to a corresponding plurality of sensors associated with a given machine for receiving sensor signals produced in response to the functions or conditions being monitored by these sensors.

Generally speaking, these input means may include one or more analog inputs or input means, here designated FA1, FA2, FA3 and FA4 for receiving signals from sensors of the type which produce an analog signal corresponding to the value of the monitored function or condition. Similarly, one or more frequency and/or digital inputs may also be provided, here designated by reference characters FQ, Fg, FD1 and FD2, for connection with sensors which produce either a digital signal, or a signal whose frequency varies in accordance with the value of the monitored function or condition. Some sensors are of the type which merely switch from one condition to another in response to some associated monitored function reaching a predetermined threshold value or limit. Inputs for such "switching" sensors are here designated as inputs plus 12(A) and plus 12(B).

One output of the circuit of FIG. 10, designated by reference numeral 42, is for energizing an optional, audible alarm such as a so-called "sonalert" device, if desired, in connection with functions or conditions with which an audible alarm is desired in the event they reach or exceed some threshold value.

Appropriate input circuits, designated generally by reference numeral 44, are provided for each of the inputs 40, and are configured for delivering compatible input signals to corresponding inputs of a microprocessor or microcomputer component 46. Preferably, microcomputer 46 comprises a single chip microcomputer of the type generally designated 8032 or 8052. The 8052 type microcomputer contains internal of "on-board" memory, whereas selection of the 8032 component requires the addition of a further outboard memory component 50, preferably of the type generally designated D87C64. An additional ROM select port 52 permits connection to either a suitable positive voltage or ground, for indicating selection of either the internal or external memory in this regard.

In the illustrated embodiment, the respective analog inputs FA1, FA2, etc. feed through their respective input circuits 44 to an analog-to-digital (A to D) converter 48, preferably of the type generally designated ADC0833, which feeds a single digital input to a corresponding input port of the microcomputer 46. Additional memory capacity is provided connected to the inputs 42, in the form of a non-volatile random access memory (NOVRAM) 54, preferably of the type generally designated NMC9346NE.

In accordance with the invention, the microcomputer component 46 and memory components 50 (if utilized) and 54 together provide processing means responsive to the sensor signals received at the input means 42 for producing display signals corresponding to the associated functions and conditions in accordance with the received sensor signals. The microcomputer and memory devices 50 (if utilized) and 54 further comprise or include memory means for storing data and instructions for enabling the processing means to respond to sensor signals from any and all of the sensor means so as to monitor any of the corresponding functions and conditions. Preferably, programming means are provided, including the operator actuatable control switches 32 illustrated and described above with reference to FIG. 1, for programming the memory means (either on-board the microcomputer 46 or external memory devices 50 and 54) with data and instructions for response to any of a wide variety of particular sensors which may be selected and coupled to the input means 40 for monitoring correspondingly selected functions and conditions of a given vehicle or machine.

In accordance with a preferred form of the invention, the memory means includes a first memory portion for containing non-changeable operating data. Such operating data would be common to all possible functions and conditions to be monitored, including mathematical calculations and subroutines which may be common to any number of conditions and functions to be monitored and to the types of signals produced by associated sensors.

For example, it can be expected that all sensors of the analog type will produce signals having some given range of voltage and current characteristics, which may be converted by the choice of suitable input circuits 44 (and/or analog to digital converter 48) to a digital form compatible with the corresponding microprocessor input ports. The format of this digital form is thus known in advance, so that appropriate programming to handle it can be fixed in non-changeable ROM type memory. Similarly, frequency or digital-type input signals may be kept within a given range by the use of suitable input circuitry. Hence, the same general mathematical functions may accommodate a plurality of signals of similar digital format or form and/or in a given range of frequencies. This is generally in line with the observation hereinabove that fixed hardware and fixed software codes running in real time, as well as general software mathematical operations packages may be realized in a generally fixed package or module in accordance with the present invention.

Moreover, the fixed software code or first memory portion may contain data or instructions for in effect recognizing all of the various types of input signals, such as those from switching type sensors and the like, so as to operate the display panel 14 and any audible alarm outputs such as output 42. Since the alarm outputs and the display panel form part of the fixed, nonchangeable module, the corresponding fixed, nonchangeable memory portion may accommodate all of the operating functions for the alarms and displays, regardless of the particular functions and conditions selected to be monitored for a given machine.

Once a given set of functions and conditions to be monitored have been selected, it follows that only certain types and kinds of sensors are appropriate for use on a given machine for detecting these functions and conditions. Accordingly, a second memory portion, accessible only to factory or service personnel, is provided for entering data corresponding generally to these selected functions and conditions, and more particularly to those types of sensors which may be selected for monitoring this given set of selected functions and conditions. Accordingly, this second memory portion will contain changeable data corresponding to those data and instructions appropriate for monitoring particular types of sensors which may be selected for association with a given machine.

A third, user-accessible memory portion is also preferably provided, which is accessible independently of the first and second memory portions described above. This third memory portion is used for receiving and storing data and instructions relating to the particular sensors selected for use with a given machine and their particular characteristics. Preferably, this user-accessible memory portion is further adapted to select either English or metric units for display, as desired by the user. Data may also be entered relating to calibration of the processing means for operation with a particular sensor or sensors coupled to the input means, as well as to user-selected alarm limits or the like. That is, the user may wish to select given values with respect to given functions and conditions of the machine which represent threshold values at which an alarm indication is to be produced.

In this latter regard, the user-accessible control means, such as the above-described switches 12 are preferably used for the entering of data into the user-accessible memory portion. Preferably, the "operating" or first memory portion mentioned above controls the manner in which the switches may be operated to accomplish user-selection of various data or entry in this fashion. Moreover, the programming means is further operable, and particularly in conjunction with the second memory portion mentioned above, for factory or service selection of the display functions to be associated with each of the visual display elements or portions 16, 18 and/or 20 of the display panel 14. That is, upon having selected certain values or conditions for display, the factory programming may proceed further by assigning the digital display characters 16 to display given values, and assigning other display characters or elements 18, 20 for displaying other values or conditions, as desired. Some of the display elements may also be selectively energized to indicate which function or condition value is currently being displayed by the digital or alphanumeric characters 16, as well.

The operating program (in the first memory portion) may also provide for user activation of one or more of the user-accessible control members 12 in a given sequence for and entering of desired data into the third memory portion. These data or values may be initially displayed on the alphanumeric characters 16, and then entered into the third memory portion when this value corresponds to some desired user-selectable data or alarm limit value, as described above.

Figure 2B:
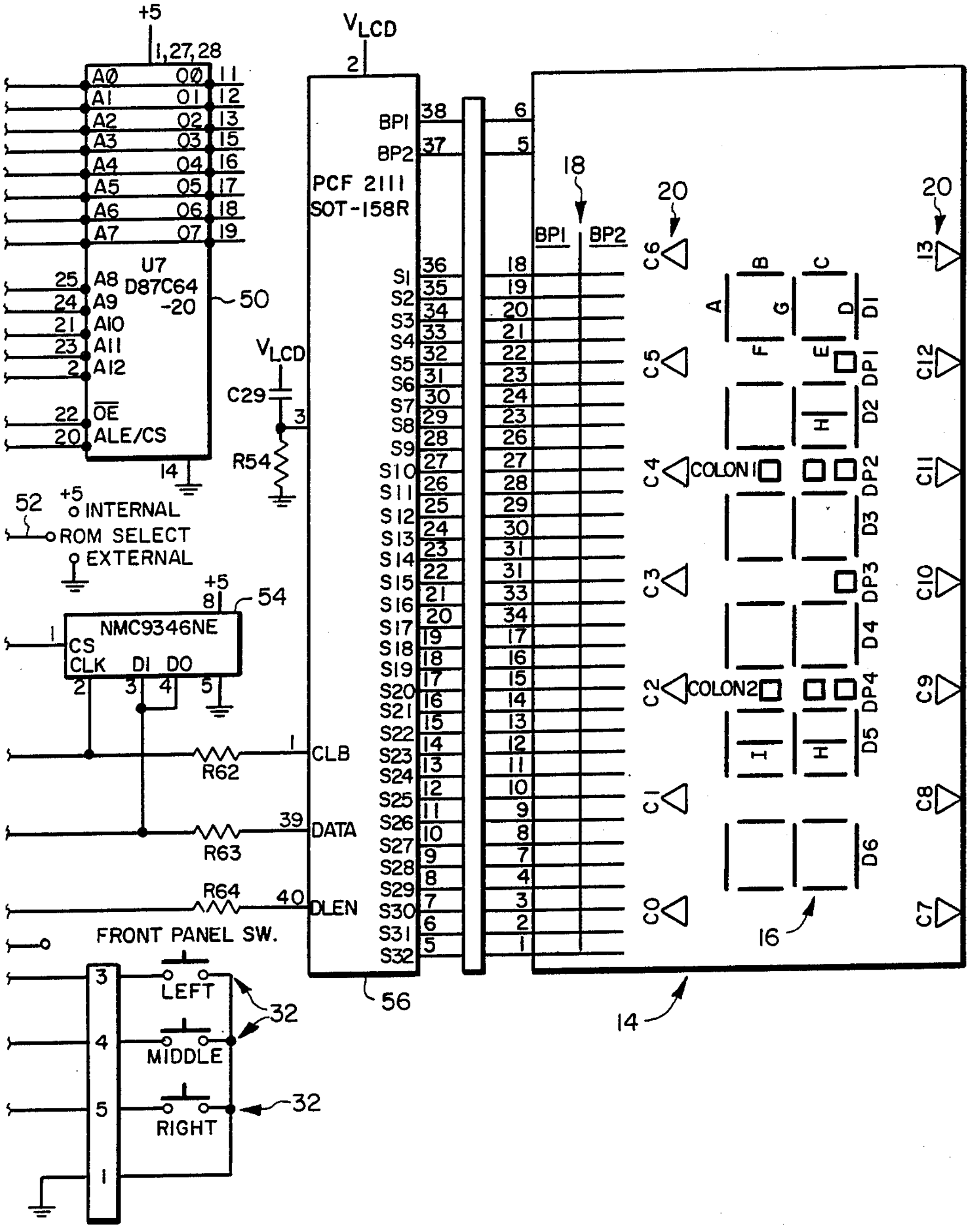

Referring briefly to FIG. 2B, a suitable display driver 56 interface component is also coupled intermediate the microcomputer 46 and display panel 14. Preferably, the display driver 56 comprises a component of the type generally designated PCF2111.

With respect to the above-described three levels of programming and corresponding three memory portions, reference is also invited to FIG. 3, which forms a functional block diagram or flow chart of the microcomputer operation. Importantly, it will be noted that the user function list is illustrated as an independent block in this program. That is, the user function code is written to operate independently of all "background" functions, and hence user function code may readily be altered to provide alternative lists of user functions. In this regard, the fixed or non-changeable data described above are referred to in FIG. 3 and hereinbelow as "background functions", and include certain fixed mathematical sub-routines, such as those here referred to as F(g) and F(Q). (These latter functions correspond to inputs Fg and FQ mentioned above).

Accordingly the microcomputer proceeds to perform various operations or functions in real time at various rates, as represented by TIMER0 (20 Hz, 10 Hz) and TIMER1 (500 Hz), generally in the order indicated in FIG. 3. These operations include not only the performing of "background functions" and reading in of data at the inputs 40, but also operating the front panel display portions. These operations also accommodate so called flag directors or preset limits of the monitor unit which will produce appropriate error indications if user operation or attempted operation goes outside of acceptable limits (i.e., the limits of the fixed operating codes). The real time operation under TIMER0 also includes internal memory functions here designated as "set up ordering" and the reading in of user-programmable data and functions, here designated as "user function list" and finally for updating the display (at a 1 Hz rate). The remaining portion of the diagram under TIMER1 indicates a fixed operations program for operating in real time to read the remaining input channels, preferably in a relatively rapid sequence, so as to in essence simultaneously monitor the signals at all inputs. A timer or clock operating at a 500 Hz rate is indicated for this operation. The inputs fA1, fA2, etc. here indicated correspond generally to the similarly-designated inputs 40 of FIGS. 2A. As already noted, functions F(g) and F(Q) also operate in connection with and accommodate inputs FQ and Fg illustrated and discussed above with reference to FIG. 2A.

In operation, and referring first to the left-hand side of FIG. 3, the timer 0 running at substantially 20 hertz initially runs background functions of the operating level programming, and then proceeds to collect data from the Fg and FQ inputs. Thereafter, front panel inputs are read. Finally, flag directors are set in the operating program. The 10 hertz clock is derived from the 20 hertz clock and initially does setup and ordering routines, followed by reading the user functions list which includes the functions and operations selected and programmed in by the user, as discussed above. Finally, a derived 1 hertz clock updates the display. Timer 1, running at a 500 hertz rate initially attends to background functions, in similar fashion to the 20 hertz timer, and thereafter serially reads the six "F" channels or inputs.

Figure 4:
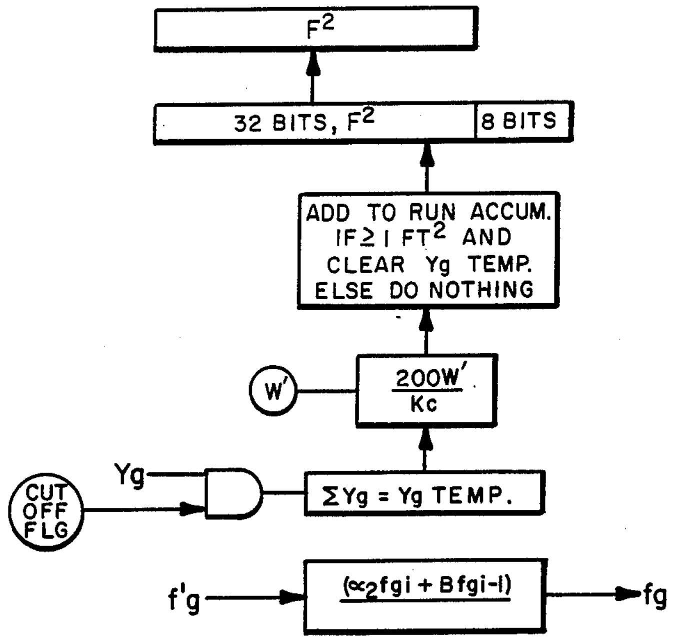
FIGS. 4 through 7 are a series of functional block diagrams, illustrating further aspects of the operation of the invention.
Figure 5:
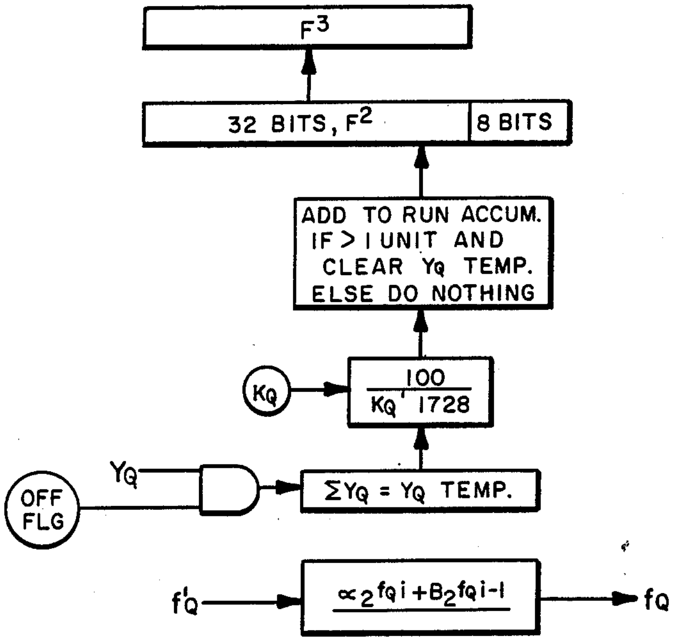
Figure 6:
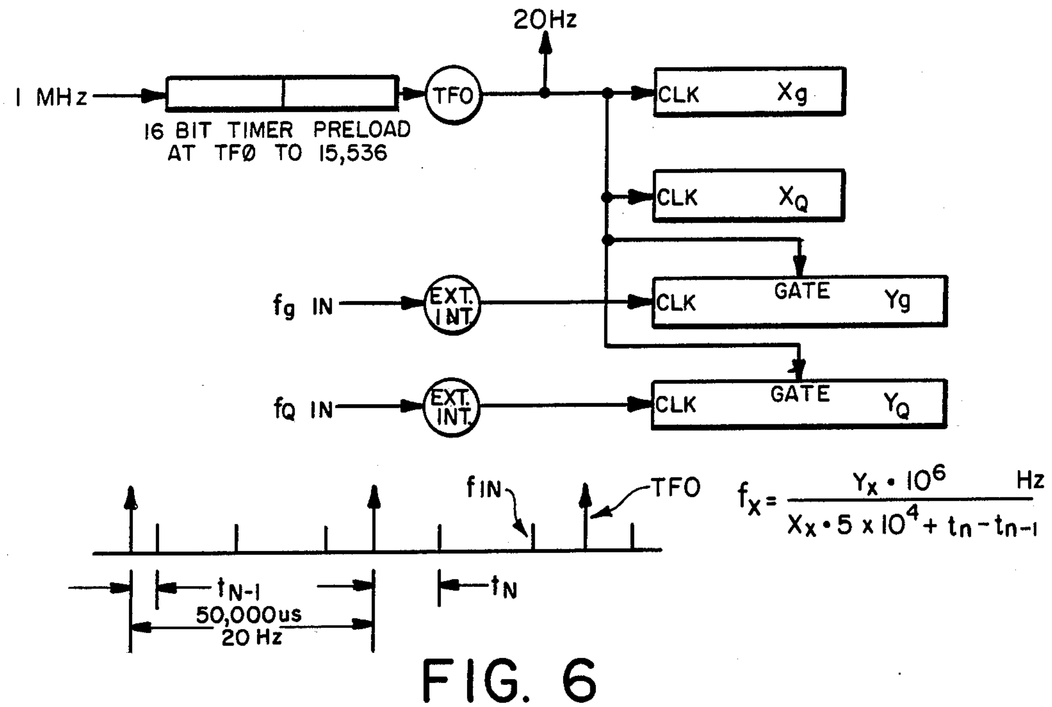

The remaining diagrams are of a block functional diagrammatic nature, illustrating various fixed subroutine or the so-called background functions (as mentioned above) for processing the Fg and FQ and the FA and FD signals, referred to hereinabove. FIGS. 4, 5 and 6 indicate processing of the FQ and Fg signals. These signals are preferably initially digitally filtered by filters of the form indicated in the lowermost functional block in each of FIGS. 4 and 5. The operation of these digital filters is essentially that illustrated and described in U.S. Pat. No. 4,633,252.

In the embodiments illustrated in FIGS. 4 and 5, the fg signal is what has been termed hereinabove a frequency-type signal, and corresponds to ground speed of a vehicle, as sense by a tachometer, radar ground speed detector or other suitable sensor. The fQ signal is also such a frequency signal, which may represent any other of transducer of the type similar to a tachometer or the like, for monitoring a rotational speed of some other machine part, or some similar frequency-related or relatable function. The signals are first converted as indicated in FIG. 6 (and described below) to "period" counts or signals Yg and YQ. It will be seen that the processing of these respective signals Yg and YQ is substantially similar. The respective signals are essentially summed or "accumulated" with various constants (KQ, KC, weighting factors W and the like) being mathematically factored in to develop corresponding "accumulated" digital signals F2 and F3.

Attention is now directed to FIG. 6, which illustrates one embodiment of the operation of the microprocessor for initial processing the signals fg and fQ, and particularly the method of obtaining related "period" count signals Yg and YQ from these frequency-related input signals. For example, at a cycling rate of 20 hertz, successive of 50,000 microsecond (50 millisecond) intervals are provided. Hence, one may count the number of frequency pulses or "interrupts" which occur during each of these 50 millisecond intervals. In the event the incoming frequency signal is less than 20 hertz, then the number of 50 ms interrupts during each cycle of the incoming frequency are counted. These two inversely related count functions are indicated as the Xg, Yg and XQ, YQ functions in the diagram of FIG. 6.

At the same time, a 16 bit timer is preloaded at each interrupt to a count of 15,536, such that at a one megahertz count rate, at the end of a 50,000 microsecond period, the counter will have reached a full count of 65, 536 (64K) to thereby fully load the 16 bit counter. The 20 hertz timing signal thus results from this operation of the 16 bit timer and one megahertz clock. FIG. 3 therefore shows in somewhat diagrammatic form the accumulation of various data from the inputs 42, under the control of clocks running at various frequencies.

Turning again to FIGS. 4 and 5, as previously mentioned, the derivation of the Yg and YQ signals or functions is as indicated in FIG. 6. These functions essentially comprise "counts" of the Fg and FQ input signals, following the initial digital filtering thereof shown in the lower portion of FIGS. 4 and 5. Thereafter, these counts are accumulated as indicated in FIGS. 4 and 5, into appropriate registers, F2 and F3.

Figure 7:
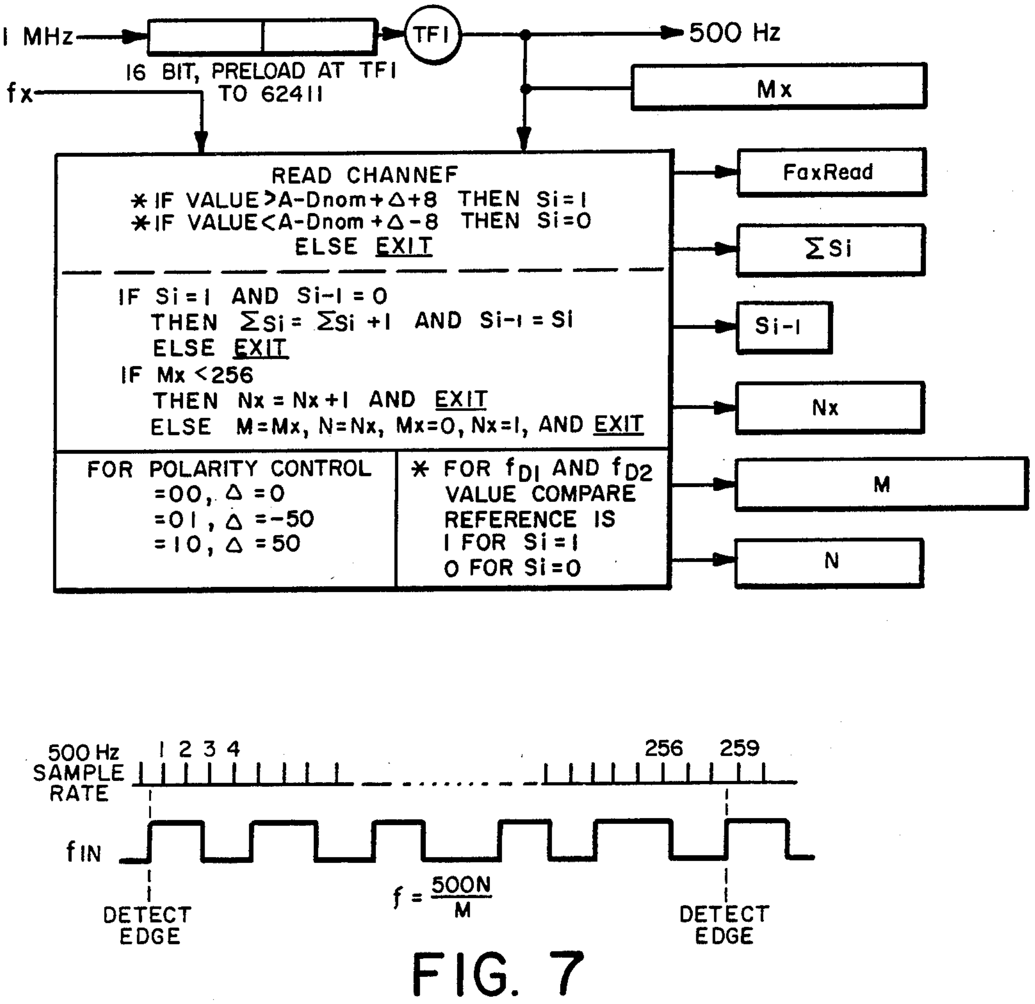

Turning briefly to FIG. 7, the effect of a 500 hertz clock on sampling remaining "F" inputs, as previously generally indicated in FIG. 3, is shown in some further detail for a typical one of these inputs or channels. That is, a given "F" input signal, here designated fx is read in at the 500 hertz rate. For those channels in which A to D conversion is used, the digital signal resulting from the A to D converter is read in. These signals can also be accumulated or summed, similar to the Fg and FQ signals, and registers and similar accumulator functions for carrying this out are also shown in FIG. 7. Preferably, these functions are carried out and the resultant values are stored in appropriate registers, whether or not the functions are selected by the user. Hence, these additional functions and registers for storing the resultant information add additional flexibility and adaptability to the apparatus and method of the invention. The lower portion of FIG. 7 briefly illustrates the effect of a 500 hertz sample rate on edge detection in a generalized random duty-cycle signal fIN.

The following tables illustrate some further details of a preferred form of the invention shown herein for illustrative purposes. It should be understood that the illustration of such a preferred form of the invention is for purposes of description only and does not limit the invention in any way. The "code list" of Table No. 1 represents the factory level programming of codes, following identification of some particular functions and conditions of a given machine or vehicle which are to be monitored. Table No. 2 consists of a so-called "formula list", which is preferably part of the ROM level or non-changeable operating level programming of the apparatus of the invention. Finally, the "user function list" of Table No. 3 represents user programmable functions in the NOVRAM, based upon a preidentified machine and list of functions and conditions to be monitored.

Figure 8A:
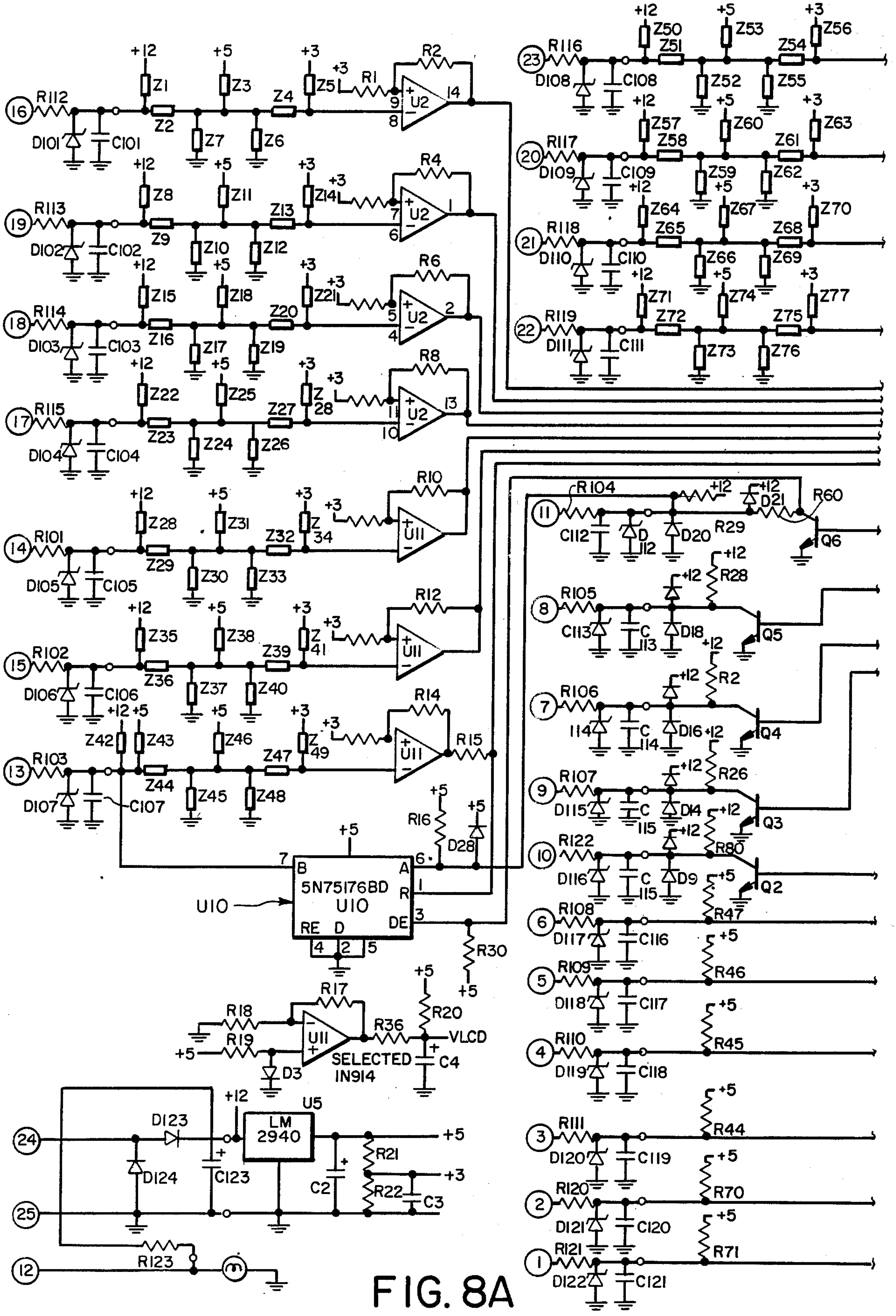
FIGS. 8A, 8B and 8C form a schematic circuit diagram of an alternate form of the circuit portion of the invention.
Figure 8B:
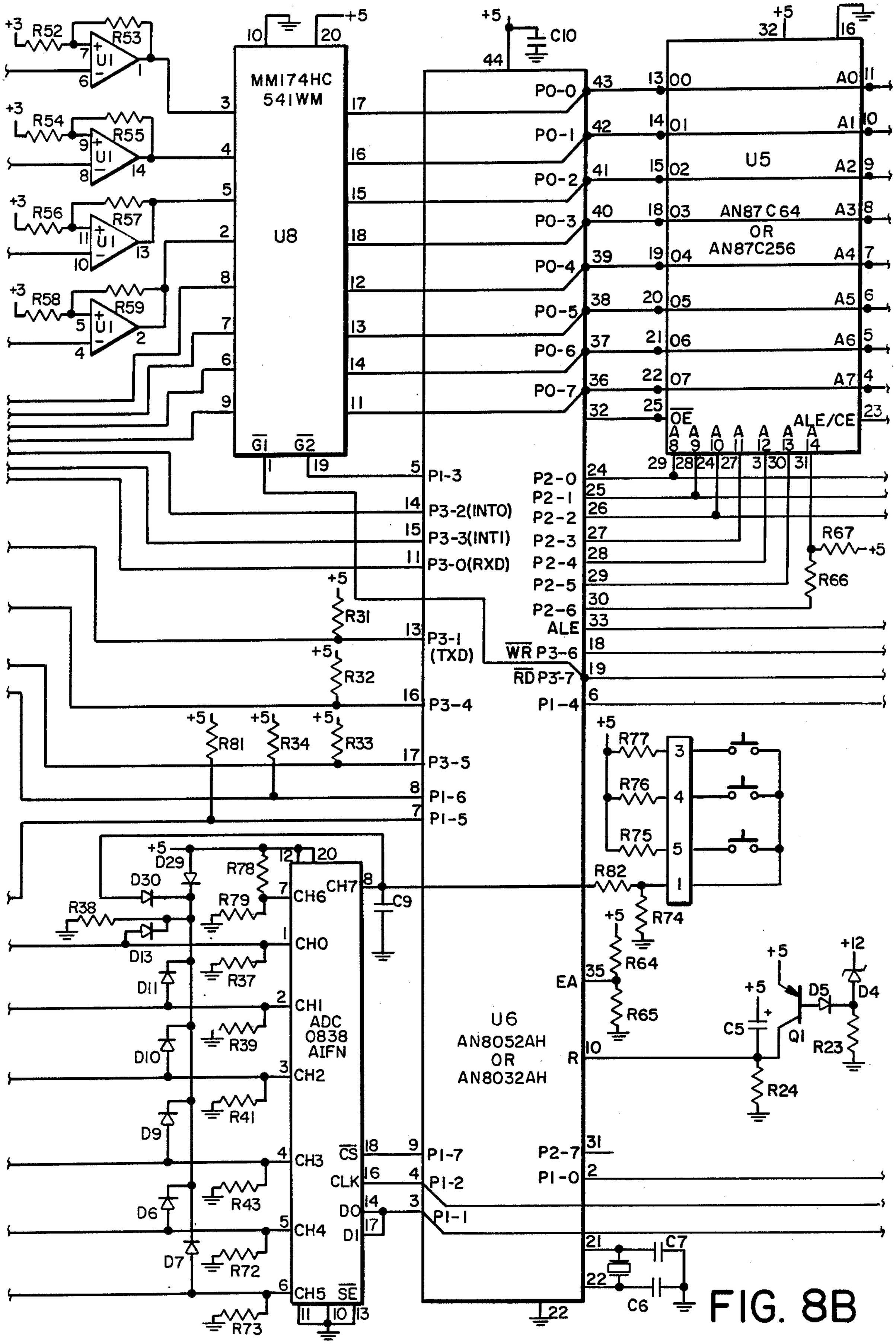
Figure 8C:
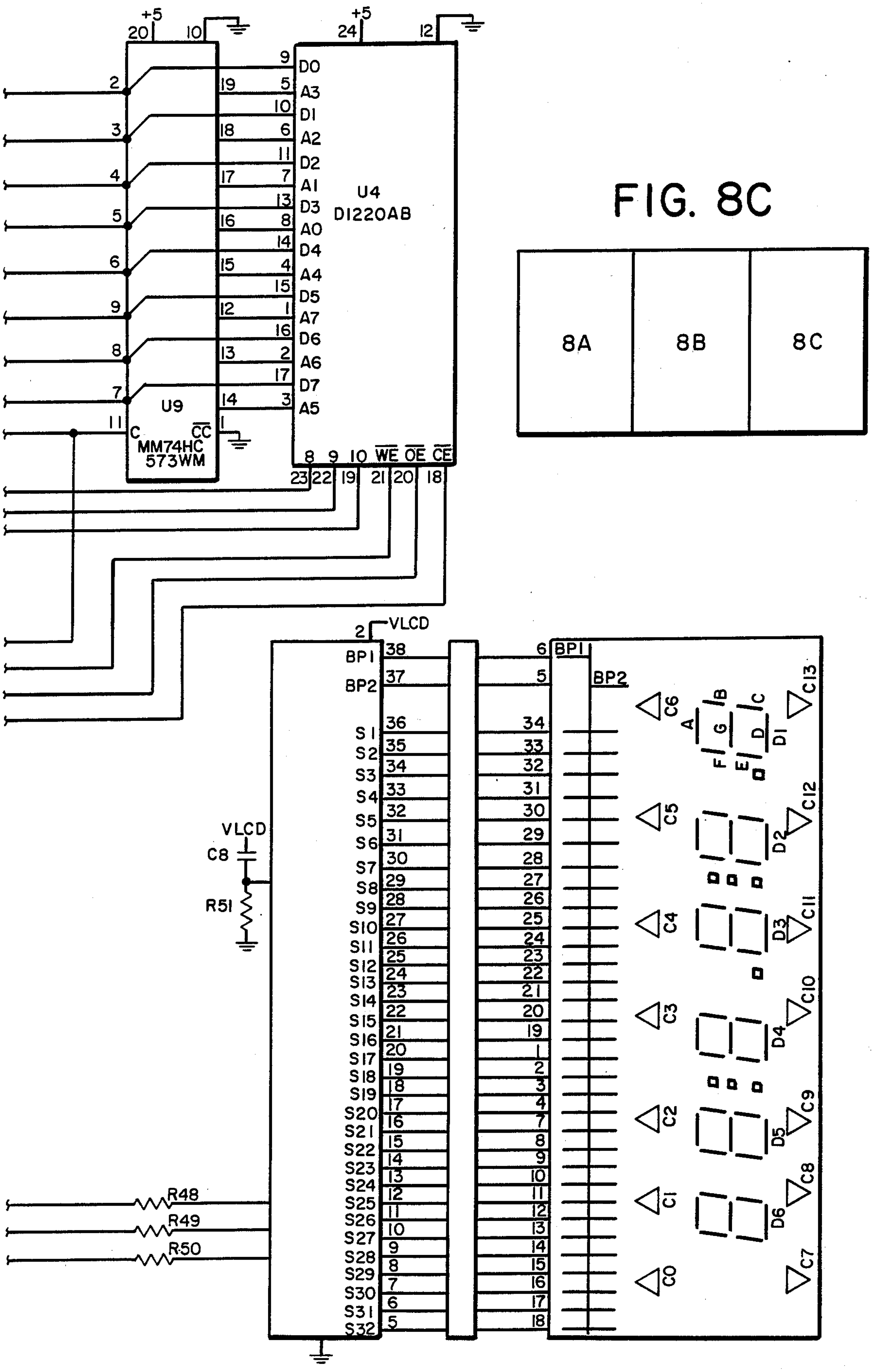

Finally, FIGS. 8A, 8B and 8C, taken together, form a schematic circuit diagram of an alternate form of circuit in accordance with the invention. The circuit of FIG. 8 is substantially similar to the circuit of FIG. 2, but represents a somewhat larger capacity arrangement, having some additional inputs and somewhat larger processing capabilities than the embodiment of FIG. 2. In all other respects, the circuit of FIG. 8 operates substantially similarly to the circuits already described hereinabove.

TABLE 1

| NOV RAM LOC | DISPLAY CODE | SYMBOL | DESCRIPTION | NOV RAM LOC | DISPLAY CODE | SYMBOL | DESCRIPTION |
|---|---|---|---|---|---|---|---|
| 0 | C1 | W | WIDTH | 18 | L2 | NONE | LIMIT VALUE |
| 1 | C2 | Gamma | fQ UNITS CONST | 19 | L3 | NONE | LIMIT VALUE |
| 2 | C3 | Kc | fg CONV CONST | 20 | L4 | NONE | LIMIT VALUE |
| 3 | C4 | Hg | GATE HEIGHT | 21 | L5 | NONE | LIMIT VALUE |
| 4 | C5 | | | 22 | L6 | NONE | LIMIT VALUE |
| 5 | C6 | KQV | ANALOG SENSOR SLOPE | 23 | L7 | NONE | LIMIT VALUE |
| 6 | C7 | KQo | ANALOG SENSOR OFFSET | 24 | L8 | NONE | LIMIT VALUE |
| 7 | C8 | KQ | fQ CONV CONST | 25 | L9 | NONE | LIMIT VALUE |
| 8 | C9 | KD1 | fd1 CONV CONST | 26 | E1 | TV | TANK CAPACITY |
| 9 | P1 | KD2 | fd2 CONV CONST | 27 | E2 | TL | TANK LEVEL (LO) |
| 10 | P2 | KA1 | fA1 CONV CONST | 28 | E3 | SL | SLIP LIMIT (HI) |
| 11 | P3 | KA2 | fA2 CONV CONST | 29 | E4 | AT | ALARM TIME |
| 12 | P4 | KA3 | fA3 CONV CONST | 30 | E5 | KV | A-D SLOPE |
| 13 | P5 | KA4 | fA4 CONV CONST | 31 | E6 | KVo | A-D OFFSET |
| 14 | P6 | | | 32 | NONE | NONE | D.P. WORD* |
| 15 | P7 | | | | | | |
| 16 | L0 | NONE | LIMIT VALUE | | | | |
| 17 | L1 | NONE | LIMIT VALUE | | | | |

TABLE 2

| NUMBER | NAME | FUNCTION |
|---|---|---|
| 0 | Ground speed | $= \frac{fg\ 200}{Kc}$ Kse MPH, (Ksm KPH) |
| 1 | *Field area | $= (F^2 - F^2{}_F)\frac{1}{Ka}$, acres, $\left(\frac{1}{\text{Km hectares}}\right)$ |
| 2 | *Total area | $= (F^2 - F^2{}_F)\frac{1}{Ka}$, acres, $\left(\frac{1}{\text{Km hectares}}\right)$ |
| 3 | area/hour | $= \frac{fg\ 200\ W^1\ 3600}{Kc\ Ka}$, acres, $\left(\frac{1}{\text{Km hectares/hr}}\right)$ |
| 4 | *Distance | $= (F^2 - F^2{}_D)\frac{1}{W^1}$ ft, (meters) |
| 5 | *Field product | $= (F^3 - F^3{}_F)\frac{\text{gamma}}{100}$ (units per gamma) |
| 6 | *Total product | $= (F^3 - F^3{}_T)\frac{\text{gamma}}{100}$ (units per gamma) |
| 7 | *Tank level | $= Tv - (F^3 - F^3{}_T)\frac{\text{gamma}}{100}$ (units per Tv, gamma) |
| 8 | product/hour | $= \frac{fg\ \text{gamma}\ 3600}{KQ\ 1728}\ \frac{\text{(units per gamma)}}{\text{hour}}$ |
| 9 | product/area | $= \frac{fQ\ \text{gamma}\ KaKc}{KQ\ 1728\ W\ fg\ 200}\ \frac{\text{(units per gamma)}}{\text{acres}}\ \frac{\text{(Km units gamma)}}{\text{hectares}}$ |
| 10 | Shaft speed | $= \frac{500\ NA1}{MA1}$ KA1, (units per KA1) |
| 11 | Shaft speed | $= \frac{500\ NA2}{MA2}$ KA2, (units per KA2) |
| 12 | Shaft speed | $= \frac{500\ NA3}{MA3}$ KA3, (units per KA3) |
| 13 | Shaft speed | $= \frac{500\ NA4}{MA4}$ KA4, (units per IA4) |
| 14 | Shaft speed | $= \frac{500\ Nd1}{Md1}$ Kd1, (units per Kd1) |
| 15 | Shaft speed | $= \frac{500\ Nd2}{Md2}$ Kd2, (units per Kd2) |
| 16 | **Wheel slip | $= 100 - \frac{(MA1\ 200\ fg\ KA1)}{5NA1\ KC}$ ***(percent) |
| 17 | ##Yield | $= Ka\frac{KA1\ 500\ \Sigma\frac{NA1}{MA1}}{(F^2 - F^2{}_F)}\ \frac{\text{(Units per KA1)}}{\text{Acre}}\ \frac{\text{(Km (Units per KA1)}}{\text{Hectare}}$ |
| 18 | Run Time | = Hrs., Min., Sec. Accumulator |
| 19 | Open | |
| 20 | Open | |
| 21 | Open | |
| 22 | Open | |
| 23 | Open | |
| 24 | Lift, Off-oper Sw.; set cut off FLG to fd1 sense register | |
| 25 | Run/hold Sw.; set cut off FLG to front panel run/hold fliptop | |
| 26 | Boom cut off | |
| 27 | Variable product: $KQ = \frac{KQ\ Hg\text{-}KQvKv}{(\text{fairead-}Kvo\text{-}KQoKv)}$ | |
| 28-33 | All read status bit (Si-1) and set appropriate display indicators | |
| 34 | Display Yg cut off flag on carrot #7 | |
| 35-38 | Open | |

TABLE 2-continued

| | |
|---|---|
| 39 | Display "STOP" flashing with alarm when fd2 active |

Note:
24 & 25 may operate simultaneously as an "and" gate input to the cut off FLG.
Not programmed
#For metric operation input W is converted from meters to feet
*Substract operation:
$2^{32} + F'' - Fx'' = x$ $$F = X - \begin{cases} 2^{32} \text{ if } x \geqq 2^{32} \\ 0 \text{ if } x < 2^{32} \end{cases}$$

**For slip zero solve for KA1 at slip = 0

$$***KA1 = \frac{500 \text{ NA1 Kc}}{\text{MA1 fg 200}}$$

GENERAL SYMBOLS AND RAM CONSTANTS fg - input freq., Hz
Kc - Grd speed cal. number, Cy/400 ft
$F^2$ - current accumulated, $ft^2$
$Ff^2$ - Begin field area, $ft^2$
$Ft^2$ - Begin total area, $ft^2$
$FD^2$ - begin distance, $ft^2$
$F^3$ - current accumulated, $ft^3/100$
$FF^3$ - begin field producet, $ft^3/100$
$FT^3$ - begin total product, $ft^3/100$
$FL^3$ - begin tank level, $ft^3/100$
TV - tank volume in units desired
fQ - volume measure freq., Hz
KQ - vol. sensor conv. constant, cy/in.$^3$
KA1-4 - sensor const. units/Hz
KD1-2 - sensor conv. const., units/Hz
KVo - A-D offset value, counts
KV - A-D slope, counts/volt
KQV - sensor slope, volts/inch
KQo - sensor offset, volts
Hg - gate height max, inch
W - width, ft (meters)
W - width converted to true implement width by boom controls or metric flag

ROM CONSTANTS

Kse - .68182 MPH/ft/sec
Ksm - 1.09728 KPH/ft/sec
Ka - 43560 $ft^2$/acre
Km - 107640.6 $ft^2$/hectare

TABLE 3

| FUNCT. # | USER FUNCT | POINTER ASSIGN-ABLE | ASSIGN-ABLE USER CONSTANTS | OPER-ATES ON FUNCTS. | POSSIBLE CONFLIC-TING FUNCTS. | ASSIGN-ABLE USER LIMITS | INPUTS USED |
|---|---|---|---|---|---|---|---|
| 0 | ground speed | yes | Kc | none | | Hi, Lo | fg |
| 1 | field area | yes | Kc, W | none | | | fg |
| 2 | total area | yes | Kc, W | none | | | fg |
| 3 | area/hour | yes | Kc, W | none | | | fg |
| 4 | distance | yes | Kc, W | none | | | fg |
| 5 | field product | yes | KQ, gamma | none | | | fQ |
| 6 | total product | yes | KQ, gamma | none | | | fQ |
| 7 | product tank level | yes | KQ, Tr, gamma | none | | Lo | fQ |
| 8 | product/hour | yes | KQ, gamma | none | | Hi, Lo | fQ |
| 9 | product/area | yes | KQ, gamma, W | none | | | fQ, fg |
| 10 | A1 shaft mon. | yes | KA1 | none | | Hi, Lo | fA1 |
| 11 | A2 shaft mon. | yes | KA2 | none | 26 | Hi, Lo | fA2 |
| 12 | A3 shaft mon. | yes | KA3 | none | 26 | Hi, Lo | fA3 |
| 13 | A4 shaft mon. | yes | KA4 | none | 26 | Hi, Lo | fA4 |
| 14 | D1 shaft mon. | yes | KD1 | none | 24 | Hi, Lo | fD1 |
| 15 | D2 shaft mon. | yes | KD2 | none | 17,28,29,39 | Hi, Lo | fD2 |

TABLE 3-continued

| FUNCT. # | USER FUNCT | POINTER ASSIGN-ABLE | ASSIGN-ABLE USER CONSTANTS | OPER-ATES ON FUNCTS. | POSSIBLE CONFLIC-TING FUNCTS. | ASSIGN-ABLE USER LIMITS | INPUTS USED |
|---|---|---|---|---|---|---|---|
| 16 | wheel slip | yes | Kc, KA1 | none | 10 | Hi | fg, fA1 |
| 17 | *yield | yes | Kc, W, KA1 | 1 | 10,15,28,29, 1, 39 | | fg, fA1 fD2 |
| 18 | run time | yes | none | none | | Hi (hrs.) (min.) | only none |
| 19 | | | | | | | |
| 20 | | | | | | | |
| 21 | | | | | | | |
| 22 | | | | | | | |
| 23 | | | | | | | |
| 24 | list, off-oper switch | no | none | 1,2,3, 9,18 | 14,25 | none | fD1 |
| 25 | run/ hold SW | no | none | 1,2,3, 9,18 | 24 | none | fA4 |
| 26 | boom cut off | no | L4 thru L9 | 1,2,3,9 | 11,12,13 | none | fA2,fA3, fA4 |
| 27 | variable product | no | KQv, Hg, KQ | 5,6,7, 8,9 | 10 | none | fA1 |
| 28 | pass/fail pointer no. 13 | no | none | none | 15,17,39 | none | fD2 |
| 29 | pass/fail pointer no. 10 | no | none | none | 15,17 | none | fD1 |
| 30 | pass/fail pointer no. 8 | no | none | none | 10,16,17 | none | fA1 |
| 31 | pass/fail pointer no. 9 | no | none | none | 11,26 | none | fA2 |
| 32 | pass/fail pointer no. 11 | no | none | none | 12,26 | none | fA3 |
| 33 | pass/fail pointer no. 12 | no | none | none | 13,26 | none | fA4 |
| 34 | pass/fail pointer no. 7 | no | none | 24,25 | | none | none |
| 35 | | | | | | | |
| 36 | | | | | | | |
| 37 | | | | | | | |
| 38 | | | | | | | |
| 39 | stop message | no | none | none | 28,15,17 | | fD2 |

(* = not programmed)

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A monitoring module for monitoring a plurality of functions and conditions of a machine, said machine having a plurality of sensors associated therewith for producing sensor signals corresponding to said plurality of functions and conditions, said monitoring module comprising: a plurality of input means for receiving respective, selected ones of said sensor signals; processing means responsive to the sensor signals received at said input means for producing display signals corresponding to the associated functions and conditions in accordance with said sensor signals; memory means for storing data and instructions for enabling said processing means to respond to the sensor signals from any of said sensor means for monitoring any of said corresponding functions and conditions; and programming means for programming said memory means with data and instructions for enabling response of said processing means to any given plurality of sensors coupled to said input means for monitoring a corresponding plurality of functions and conditions; wherein said memory means comprises a first memory portion for containing nonchargeable operating data, a second memory portion accessible only to authorized factory or service programming personnel for containing changeable data corresponding to data and instructions for monitoring particular types of sensors which may be selected for association with a given machine, and a third, user-accessible memory portion accessible independently of said first and second memory portions for receiving and storing data and instructions relating to the particular characteristics of particular sensors selected for use with a given machine.

2. A module according to claim 1 and further including operator accessible console means including observable display means for displaying functions and conditions monitored by said monitoring module in accordance with the display signals produced, and for selecting particular ones of said functions and conditions for display as desired.

3. A module according to claim 2 wherein said user accessible memory portion is further adapted to receive user-selected data corresponding to selection of English or metric units for display, to calibration of said processing means for operation with the particular sensors selected for use with a given machine, to user-selected alarm limits, and the like.

4. A module according to claim 2 wherein said programming means includes operator accessible control means for entering the desired data to said user-accessible memory portion.

5. A monitoring module according to claim 2 wherein said display means comprises a plurality of visual display elements responsive to said display signals for producing visual displays corresponding to said plurality of said functions and conditions; and further including label means capable of being selectively superimposed upon said visual display means for labeling the display elements thereof in accordance with the functions and conditions corresponding to the sensors coupled to the input means of the module.

6. A module according to claim 5 wherein said programming means includes means for selecting the display functions to be associated with each said visual display elements.

7. A monitoring system for monitoring a plurality of functions and conditions of a machine, said machine including a plurality of sensors for producing sensor signals corresponding to said plurality of functions and conditions, said monitoring system comprising: a plurality of physically substantially identical monitoring modules, each comprising a plurality of input means for receiving respective ones of said sensor signals, processing means responsive to said sensor signals at said input means for producing display signals corresponding to the associated functions and conditions in accordance with said sensor signals, memory means for storing data and instructions for enabling said processing means to respond to the sensor signals from any of said sensor means by monitoring any of said corresponding functions and conditions, and programming means for programming said memory means with data and instructions for monitoring said plurality of functions and conditions; wherein said memory means comprises a first memory portion for containing non-chargeable operating data, a second memory portion accessible only to authorized factory or service programming personnel for containing changeable data, including data and instructions for enabling response to a given plurality of functions and conditions to be monitored by each monitoring module, and a third, user-accessible memory portion programmable independently of said first and second memory portions for receiving and storing data relating to the particular characteristics of particular sensors selected for use with a given machine.

8. A system according to claim 7 wherein said user accessible memory portion is further adapted to receive and store user-selected data corresponding to the selection of English or metric units for display, to calibration of said processing means for operation with the particular sensor selected for use with a given machine, and for setting alarm limits for selected functions and conditions.

9. A method for monitoring a plurality of functions and conditions of a machine, said machine including a plurality of sensors for producing sensor signals corresponding to said plurality of functions and conditions, said monitoring method comprising: providing at least one monitoring module comprising a plurality of input means for receiving a selected one of said sensor signals, said module further comprising processing means responsive to said sensor signals at said input means for producing display signals corresponding to the associated functions and conditions in accordance with said sensor signals, display means responsive to the display signals for producing observable indications of the corresponding functions and conditions, and memory means for storing data and instructions for monitoring said processing means to respond to the sensor signals from any of the sensor means for monitoring any of the corresponding functions and conditions; and programming said memory means with data and instructions for monitoring said plurality of functions and conditions; wherein the step of programming said memory means comprises programming a first memory portion with non-changeable operating data and instructions, programming a second memory portion accessible only to authorized factory or service personnel with changeable data specific to the selected functions and conditions to be monitored by a given module and programming a third user-accessible memory portion, independently of said first and second memory portions, with data relating to the particular characteristics of particular sensors coupled to each said input means.

10. A method according to claim 9 wherein each said monitoring module also includes a plurality of visual display elements and further including the step of superimposing one of a plurality of selectable labels upon said visual display elements, each label being selected for labeling the display elements of the module upon which it is superimposed in accordance with the functions and conditions corresponding to the sensors coupled to the input means of that module.

11. A method according to claim 9 wherein said step of programming further includes programming said memory portion accessible only to authorized factory or service programming personnel with commands for the selection of a display format and for the selection of the one or ones of said visual display elements upon which each of said functions and conditions is to be displayed.

12. A monitoring system for monitoring a plurality of functions and conditions of a machine, said machine including a plurality of sensors for producing sensor signals corresponding to said plurality of sensors for producing sensor signals corresponding to said plurality of functions and conditions, said monitoring system comprising: a plurality of physically substantially identical monitoring modules, each comprising a plurality of input means for receiving respective ones of said sensor signals, processing means responsive to said sensor signals at said input means for producing display signals corresponding to the associated functions and conditions in accordance with said sensor signals, memory means for storing data and instructions for enabling said processing means to respond to the sensor signals from any of said sensor means for monitoring any of said corresponding functions and conditions, and programming means for programming said memory means with data and instructions for monitoring said plurality of functions and conditions, and further including operator accessible console means including observable display means for displaying functions and conditions as monitored by each said monitoring module in accordance with the display signals produced thereby and for selecting particular ones of said functions and conditions for display as desired, and wherein said display means comprises a plurality of visual display elements responsive to said display signals for producing visual displays corresponding to said plurality of functions and conditions; and further including a plurality of selectable label means capable of being respectively superimposed upon said visual display elements of each module for labeling the display elements thereof in accordance with the functions and conditions selected for monitoring and display thereby.

13. A system according to claim 12 wherein said programming means includes operator accessible control means for entering the desired data to said user-accessible memory portion and for selecting particular functions and conditions for display on said observable display means.

14. A monitoring system according to claim 12 wherein said display means comprises a plurality of visual display elements responsive to said display signals for producing visual displays corresponding to said plurality of functions and conditions; and further including a plurality of selectable label means capable of being respectively superimposed upon said visual display elements of each module for labeling the display elements thereof in accordance with the functions and conditions selected for monitoring and display thereby.

15. A system according to claim 14 wherein said programming means includes means for assigning a display element to be associated with each of the plurality of functions and conditions to be monitored by the associated module.

* * * * *